US009767383B2

United States Patent
Piotto et al.

(10) Patent No.: US 9,767,383 B2
(45) Date of Patent: Sep. 19, 2017

(54) METHOD AND APPARATUS FOR DETECTING INCORRECT ASSOCIATIONS BETWEEN KEYPOINTS OF A FIRST IMAGE AND KEYPOINTS OF A SECOND IMAGE

(71) Applicant: Huawei Technologies Duesseldorf GmbH, Düsseldorf (DE)

(72) Inventors: Nicola Piotto, Munich (DE); Giovanni Cordara, Munich (DE)

(73) Assignee: Huawei Technologies Duesseldorf GmbH, Dusseldorf (DE)

( * ) Notice: Subject to any disclaimer, the term of this patent is extended or adjusted under 35 U.S.C. 154(b) by 0 days.

(21) Appl. No.: 15/224,094

(22) Filed: Jul. 29, 2016

(65) Prior Publication Data

US 2016/0335523 A1 Nov. 17, 2016

Related U.S. Application Data

(63) Continuation of application No. PCT/EP2014/051848, filed on Jan. 30, 2014.

(51) Int. Cl.
  *G06K 9/62* (2006.01)
  *G06F 17/30* (2006.01)
  *G06K 9/46* (2006.01)

(52) U.S. Cl.
  CPC ..... *G06K 9/6215* (2013.01); *G06F 17/30247* (2013.01); *G06K 9/4671* (2013.01); *G06K 2009/6213* (2013.01)

(58) Field of Classification Search
  CPC .. G06K 9/6215; G06K 9/6407; G06K 9/2009; G06K 9/6423; G06K 9/4671; G06K 2009/6213; G06F 17/30249; G06T 7/001
  See application file for complete search history.

(56) References Cited

U.S. PATENT DOCUMENTS 9,420,299 B2 *   8/2016   Cordara
2009/0268809 A1 * 10/2009   Cordara ............... H04N 19/395
                                              375/240.12
(Continued)

FOREIGN PATENT DOCUMENTS

WO   WO 2012100819 A1   8/2012
WO   WO 2013102488 A1   7/2013

OTHER PUBLICATIONS

Bay, "SURF: Speeded Up Robust Features," European conference on computer vision, pp. 1-14 (May 5, 2006).
(Continued)

*Primary Examiner* — Amir Alavi
(74) *Attorney, Agent, or Firm* — Leydig, Voit & Mayer, Ltd.

(57) ABSTRACT

The invention relates to a method (100) for detecting incorrect associations between keypoints of a first image and keypoints of a second image, the method (100) comprising associating (101) every keypoint of the first image with every keypoint of the second image to obtain global associations, determining (103) similarity measures for pairs of initial associations, determining (105) similarity measures for pairs of global associations, determining (107) a first number of pairs of initial associations having a similarity measure within a predetermined range, determining (109) a second number of pairs of global associations having a similarity measure within the predetermined range, and comparing (111) the first number of pairs with the second number of pairs to detect the incorrect associations. The invention further relates to an apparatus for detecting incorrect associations between keypoints of a first image and keypoints of a second image.

15 Claims, 16 Drawing Sheets

(56) References Cited

U.S. PATENT DOCUMENTS

| | | | | |
|---|---|---|---|---|
| 2009/0304090 | A1* | 12/2009 | Cordara | H04N 19/53 375/240.26 |
| 2010/0215248 | A1* | 8/2010 | Francini | G06K 9/209 382/154 |
| 2012/0299932 | A1* | 11/2012 | Cordara | G06T 11/203 345/442 |
| 2013/0308861 | A1* | 11/2013 | Cordara | G06K 9/68 382/170 |
| 2015/0022645 | A1* | 1/2015 | Bouazizi | H04N 13/007 348/51 |
| 2015/0023588 | A1* | 1/2015 | Barone | G06T 7/0075 382/154 |
| 2015/0201179 | A1* | 7/2015 | Bouazizi | H04L 65/4092 348/43 |
| 2016/0335523 | A1* | 11/2016 | Piotto | G06F 17/30247 |

OTHER PUBLICATIONS

Chum et al., "Matching PROSAC—Progressive Sample Consensus," IEEE Computer Society Conference on Computer Vision and Pattern Recognition, pp. 1-7, Institute of Electrical and Electronics Engineers, New York, New York (Jun. 20-25, 2005).

Fischler et al., "Random Sample Consensus: A Paradigm for Model Fitting with Applications to Image Analysis and Automated Cartography," Communications of the ACM, vol. 24, No. 6, pp. 381-395, ACM, New York, New York (Jun. 1981).

Kanazawa et al., "Do we really have to consider covariance matrices for image features?" Proceedings of the $8^{th}$ IEEE International Conference on Computer Vision, Vancouver, Canada, vol. 2, pp. 301-306, Institute of Electrical and Electronics Engineers, New York, New York (Jul. 7-14, 2001).

Lepsoy et al., "Statistical Modelling of Outliers for Fast Visual Search," IEEE International Conference on Multimedia and Expo, pp. 1-6, Institute of Electrical and Electronics Engineers, New York, New York (Jul. 11-15, 2011).

Leutenegger et al., "BRISK: Binary Robust Invariant Scalable Keypoints," International Conference on Computer Vision, pp. 2548-2555, Institute of Electrical and Electronics Engineers, New York, New York (Nov. 6-13, 2011).

Lowe, "Distinctive Image Features from Scale-Invariant Keypoints," Article Accepted for Publication in the International Journal of Computer Vision, pp. 1-28 (Jan. 5, 2004).

Park et al., "Spatial Uncertainty Model for Visual Features Using a Kinect Sensor," Sensors, vol. 12, No. 12, pp. 8640-8662, MDPI, Basel, Switzerland (Jun. 26, 2012).

Rublee et al., "ORB: an efficient alternative to SIFT or SURF," International Conference on Computer Vision, pp. 1-8, Institute of Electrical and Electronics Engineers, New York, New York (Nov. 6-13, 2011).

Sinha et al., "Piecewise Planar Stereo for Image-based Rendering," IEEE $12^{th}$ International Conference on Computer Vision, Kyoto, Japan, pp. 1881-1888, Institute of Electrical and Electronics Engineers, New York, New York (Sep. 29-Oct. 2, 2009).

Sur, "Robust matching in an uncertain world," $20^{th}$ International Conference on Pattern Recognition, pp. 2350-2353, Institute of Electrical and Electronics Engineers, New York, New York (Aug. 23-26, 2010).

Szeliski, "Computer Vision: Algorithms and Applications," Draft, pp. i-957, Springer Publishing, New York, New York (Sep. 3, 2010).

Zeisl et al., "Estimation of Location Uncertainty for Scale Invariant Feature Points," British Machine Vision Conference, London, United Kingdom, pp. 1-12 (Sep. 7-10, 2009).

* cited by examiner

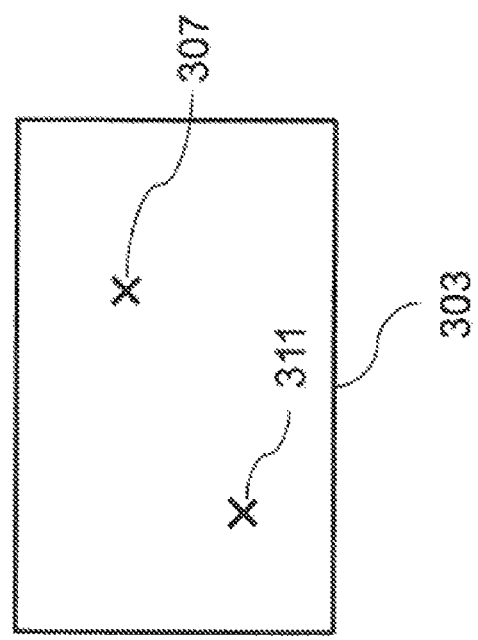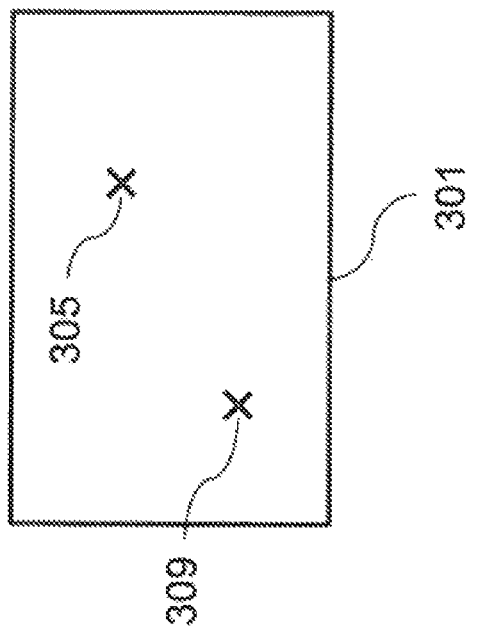
Fig. 3

METHOD AND APPARATUS FOR DETECTING INCORRECT ASSOCIATIONS BETWEEN KEYPOINTS OF A FIRST IMAGE AND KEYPOINTS OF A SECOND IMAGE

CROSS-REFERENCE TO RELATED APPLICATIONS

This application is a continuation of International Patent Application No. PCT/EP2014/051848, filed on Jan. 30, 2014, which is hereby incorporated by reference in its entirety.

TECHNICAL FIELD

The invention relates to the field of computer vision, in particular to image matching.

BACKGROUND OF THE INVENTION

The capability of assessing a similarity between images is a basic but complex task that can serve as a building block for a wide range of applications. The applications can comprise e.g. visual search, object detection, object recognition, camera tracking, object tracking, and scene reconstruction.

An image similarity assessment is easily solved by a human, but is a difficult problem from a machine point of view, since it is based on an automatic interpretation of the image content starting from various low-level attributes. Therefore, image matching techniques are employed.

Methods for image matching rely on so called local features. A local feature is a compact description of a patch surrounding a point in an image. The points upon which local features are determined identify characteristic features of the image, e.g. corners, whose detection is stable to illumination, scale, rotation, and perspective changes. Such points are also called keypoints and the similarity between image pairs can be assessed through the number and the positions of keypoints shared by the images. Due to noise effects in the keypoint detection or to mismatching of the keypoints, the matching result typically comprises correct associations, i.e. inliers, and incorrect associations, i.e. outliers.

In Lepsoy, S., Francini, G., Cordara, G., de Gusmao, P. P. B., "Statistical modelling of outliers for fast visual search", IEEE International Conference on Multimedia and Expo, 11-15 Jul. 2011, an image comparison approach is described.

SUMMARY OF THE INVENTION

It is the object of the invention to provide an efficient method for detecting incorrect associations between keypoints of a first image and keypoints of a second image.

This object is achieved by the features of the independent claims. Further implementation forms are apparent from the dependent claims, the description and the figures.

The invention is based on the finding that similarity measures can be determined for pairs of initial associations, which can be provided by keypoint matching techniques, and global associations, which can be obtained by associating every keypoint of the first image with every keypoint of the second image. The initial associations predominantly comprise correct associations, wherein the global associations predominantly comprise incorrect associations. By statistically evaluating the similarity measures for pairs of initial associations and pairs of global associations, the incorrect associations within the initial associations can be detected by statistical approaches.

The similarity measures can be logarithmic distance ratios (LDRs), which allow for employing a similarity-invariant measure. The distances can be Mahalanobis distances which account for uncertainties of the locations of the keypoints in the first image and the second image. The uncertainties of the locations can be defined using covariance matrixes, wherein an efficient determination of the covariance matrixes can be realized for two-dimensional images and for three-dimensional images.

According to a first aspect, the invention relates to a method for detecting incorrect associations between keypoints of a first image and keypoints of a second image, keypoints of the first image indicating characteristic features of the first image being associated with keypoints of the second image indicating characteristic features of the second image whereby initial associations between keypoints of the first image and keypoints of the second image are formed, the initial associations being indicated by an indicator, the initial associations comprising the incorrect associations, the method comprising associating every keypoint of the first image with every keypoint of the second image to obtain global associations, determining similarity measures for pairs of initial associations, determining similarity measures for pairs of global associations, determining a first number of pairs of initial associations having a similarity measure within a predetermined range, determining a second number of pairs of global associations having a similarity measure within the predetermined range, and comparing the first number of pairs with the second number of pairs to detect the incorrect associations. Thus, an efficient method for detecting incorrect associations between keypoints of a first image and keypoints of a second image can be provided.

The first image and the second image can be texture images. The first image and the second image can further comprise depth maps. The characteristic features of the first image or the second image can be geometric features, such as corners.

The initial associations between keypoints of the first image and keypoints of the second image can be obtained by keypoint matching techniques. The indicator can be a vector or a matrix. A similarity measure for a pair of initial associations or for a pair of global associations can be a real number, e.g. 1.8 or 2.5.

The predetermined range can be a range of real numbers, e.g. 1.0 to 1.2. The predetermined range can be a bin of a histogram of the similarity measures for pairs of initial associations or a bin of a histogram of the similarity measures for pairs of global associations.

The distribution of the similarity measures for pairs of initial associations and the distribution of the similarity measures for pairs of global associations can indicate a respective probability density function. Therefore, the statistics of the similarity measures can be considered. The incorrect associations can consequently be detected by statistical comparison.

In a first implementation form of the method according to the first aspect as such, the method further comprises normalizing the first number of pairs by the number of all pairs of initial associations, and normalizing the second number of pairs by the number of all pairs of global associations. Thus, the comparing of the first number of pairs with the second number of pairs can be improved.

The normalization of the first number of pairs can be realized by weighting or dividing the first number of pairs by the number of all pairs of initial associations. The normalization of the second number of pairs can be realized by weighting or dividing the second number of pairs by the number of all pairs of global associations.

In a second implementation form of the method according to the first aspect as such or any preceding implementation form of the first aspect, a pair of initial associations or a pair of global associations comprises a first association and a second association, wherein the first association comprises a first keypoint in the first image and a second keypoint in the second image, wherein the second association comprises a third keypoint in the first image and a fourth keypoint in the second image, and wherein a similarity measure for the pair of initial associations or the pair of global associations is determined according to the following equations:

$$ldr(x_i, x_j, y_i, y_j) = \ln\left(\frac{\|x_i - x_j\|}{\|y_i - y_j\|}\right)$$

$$\|x_i-x_j\| = \text{sqrt}((x_i-x_j)C_{xixj}(x_i-x_j)) \text{ with } C_{xixj}=C_{xi}+C_{xj}$$

$$\|y_i-y_j\| = \text{sqrt}((y_i-y_j)C_{yiyj}(y_i-y_j)) \text{ with } C_{yiyj}=C_{yi}+C_{yj}$$

wherein $x_i$ denotes a location of the first keypoint in the first image, $x_j$ denotes a location of the third keypoint in the first image, $y_i$ denotes a location of the second keypoint in the second image, $y_j$ denotes a location of the fourth keypoint in the second image, $\|\cdot\|$ denotes a distance, sqrt denotes a square-root operation, $C_{xi}$ denotes a first covariance matrix, $C_{xj}$ denotes a third covariance matrix, $C_{yi}$ denotes a second covariance matrix, $C_{yj}$ denotes a fourth covariance matrix, $C_{xixj}$ denotes a first combined covariance matrix, and $C_{yiyj}$ denotes a second combined covariance matrix, and ldr denotes the similarity measure. Thus, a similarity-invariant measure can be employed.

The similarity measure can be a log-distance-ratio (LDR), wherein the distance $\|x_i-x_j\|$ between the location of the first keypoint and the location of the third keypoint and the distance $\|y_i-y_j\|$ between the location of the second keypoint and the location of the fourth keypoint can be Mahalanobis distances. The Mahalanobis distances can account for uncertainties in the location of the keypoints, which can be modeled by error ellipses or error ellipsoids. The distances $\|\cdot\|$ may not relate to L2-norms.

In a third implementation form of the method according to the second implementation form of the first aspect, the first covariance matrix or the third covariance matrix is determined upon the basis of a second derivative of values of pixels of the first image, and wherein the second covariance matrix or the fourth covariance matrix is determined upon the basis of a second derivative of values of pixels of the second image. Thus, an efficient determination of covariance matrixes can be provided. The second derivative can comprise a Hessian or an inverse Hessian matrix operation.

In a fourth implementation form of the method according to the second implementation form of the first aspect, the first image comprises a first depth map and the second image comprises a second depth map, wherein the first depth map indicates depths of keypoints of the first image, wherein the second depth map indicates depths of keypoints of the second image, and wherein the first covariance matrix, the second covariance matrix, the third covariance matrix, or the fourth covariance matrix is determined upon the basis of the first depth map or the second depth map. Thus, a determination of the covariance matrixes in three-dimensional images can be realized.

The covariance matrixes can e.g. be determined upon the basis of the horizontal and vertical fields of views and resolutions of the texture images leading to raster variances in horizontal and vertical dimensions. For a three-dimensional point, a covariance matrix can be a diagonal 3×3 matrix wherein the elements of each row express the covariance in the three spatial dimensions. The covariance matrix can be determined upon the basis of a z-coordinate of the point defined by the first depth map or second depth map. Furthermore, a depth sensor accuracy parameter for the depth determination or a confidence value for an estimated depth computed from a multiple camera system can be considered. A confidence value of the computed cost for disparity can be computed from multiple cameras.

In a fifth implementation form of the method according to the first aspect as such or any preceding implementation form of the first aspect, the first image comprises a first depth map and the second image comprises a second depth map, wherein the first depth map indicates depths of keypoints of the first image, wherein the second depth map indicates depths of keypoints of the second image, and wherein the similarity measures for the pairs of initial associations and the pairs of global associations are determined upon the basis of the first depth map and the second depth map. Thus, an improved detection of incorrect associations for three-dimensional images can be realized.

In a sixth implementation form of the method according to the first aspect as such or any preceding implementation form of the first aspect, the first image is characterized by a first image capturing parameter and the second image is characterized by a second image capturing parameter, and wherein the similarity measures for the pairs of initial associations and the pairs of global associations are determined upon the basis of the first image capturing parameter and the second image capturing parameter. Thus, an improved determination of the location of the keypoints can be realized.

The image capturing parameters can comprise camera intrinsic parameters. The image capturing parameters can comprise focal lengths of the image cameras, optical centers of the image cameras, and/or pixel aspect ratios of the image cameras.

In a seventh implementation form of the method according to the first aspect as such or any preceding implementation form of the first aspect, the method comprises detecting keypoints in the first image by detecting characteristic features, in particular corners, in the first image, and detecting keypoints in the second image by detecting characteristic features, in particular corners, in the second image. Thus, a detection of keypoints using feature detection techniques can be achieved.

The detection of the keypoints can e.g. be performed using a scale-invariant feature transform (SIFT) technique, a speeded up robust features (SURF) technique, or a binary robust invariant scalable keypoints (BRISK) technique. The techniques can detect different characteristic features. The binary robust invariant scalable keypoints (BRISK) technique can, in particular, be used for detecting corners.

In an eighth implementation form of the method according to the seventh implementation form of the first aspect, the method further comprises determining first descriptors of the detected keypoints in the first image, the first descriptors indicating features of the detected keypoints in the first image, determining second descriptors of the detected keypoints in the second image, the second descriptors indicating features of the detected keypoints in the second image, and associating the detected keypoints of the first image with the detected keypoints of the second image upon the basis of the first descriptors and the second descriptors to obtain the initial associations. Thus, an efficient determination of initial associations can be achieved.

The features of the detected keypoints can comprise features of image patches around the keypoints. The features of the detected keypoints can comprise gradients, colors, and/or shapes. The associating upon the basis of the first descriptors and the second descriptors can be based on an Euclidian distance, a brute-force approach, or a kd-tree approach.

In a ninth implementation form of the method according to the first aspect as such or any preceding implementation form of the first aspect, the first image comprises a first depth map and the second image comprises a second depth map, wherein the first depth map indicates a depth of pixels of the first image, wherein the second depth map indicates a depth of pixels of the second image, and wherein a value of a pixel of the first image or a value of a pixel of the second image is manipulated, in particular set to zero, in dependence of a value of a pixel of the first depth map or a value of a pixel of the second depth map. Thus, a region of interest (ROI) masking of the first image or the second image can be achieved.

In a tenth implementation form of the method according to the first aspect as such or any preceding implementation form of the first aspect, comparing the first number of pairs with the second number of pairs comprises determining whether the first number of pairs is smaller than the second number of pairs, and detecting the incorrect associations if the first number of pairs is smaller than the second number of pairs. Thus, a statistical significance for detecting the incorrect associations can be achieved.

The detection of the incorrect associations can be performed upon the basis of a statistical goodness-of-fit test. The detection of the incorrect associations can further be based on a chi-square test.

If the first number of pairs is smaller than the second number of pairs, the associations of pairs of initial associations having a similarity measure within the predetermined range can be detected as incorrect associations. If the first number of pairs is larger than the second number of pairs, the associations of pairs of initial associations having a similarity measure within the predetermined range can be detected as correct associations.

The comparing of the first number of pairs with the second number of pairs can relate to comparing a bin of a histogram of the similarity measures for pairs of initial associations with a bin of a histogram of the similarity measures for pairs of global associations. The concept of determining differences between the distributions to detect a number of correct associations or inliers can be applicable or valid within a single histogram bin which can comprise or can be referred to as predetermined range.

According to a second aspect, the invention relates to an apparatus for detecting incorrect associations between keypoints of a first image and keypoints of a second image, keypoints of the first image indicating characteristic features of the first image being associated with keypoints of the second image indicating characteristic features of the second image whereby initial associations between keypoints of the first image and keypoints of the second image are formed, the initial associations being indicated by an indicator, the initial associations comprising the incorrect associations, the apparatus comprising a processor being configured to associate every keypoint of the first image with every keypoint of the second image to obtain global associations, to determine similarity measures for pairs of initial associations, to determine similarity measures for pairs of global associations, to determine a first number of pairs of initial associations having a similarity measure within a predetermined range, to determine a second number of pairs of global associations having a similarity measure within the predetermined range, and to compare the first number of pairs with the second number of pairs to detect the incorrect associations. Thus, an apparatus for efficiently detecting incorrect associations between keypoints of a first image and keypoints of a second image can be provided.

The processor can be configured to execute a computer program.

The apparatus can perform the method according to the first aspect. Further features of the apparatus can directly result from the functionality of the method according to the first aspect.

In a first implementation form of the apparatus according to the second aspect as such, the processor is further configured to detect keypoints in the first image by detecting characteristic features, in particular corners, in the first image, and to detect keypoints in the second image by detecting characteristic features, in particular corners, in the second image. Thus, a detection of keypoints using feature detection techniques can be achieved.

In a second implementation form of the apparatus according to the first implementation form of the second aspect, the processor is further configured to determine first descriptors of the detected keypoints in the first image, the first descriptors indicating features of the detected keypoints in the first image, to determine second descriptors of the detected keypoints in the second image, the second descriptors indicating features of the detected keypoints in the second image, and to associate the detected keypoints of the first image with the detected keypoints of the second image upon the basis of the first descriptors and the second descriptors to obtain the initial associations. Thus, an efficient determination of initial associations can be achieved.

In further implementation forms of the apparatus according to the second aspect, the implementation forms are adapted to perform one, some or all of the implementation forms of the method according to the first aspect.

According to a third aspect, the invention relates to a computer program comprising a program code for performing the method according to the first aspect as such or any implementation form of the first aspect, when executed on a computer. Thus, the method can be applied in an automatic and repeatable manner.

The computer program can be provided in form of a machine-readable program code. The program code can comprise a series of commands for a processor of the computer. The processor of the computer can be configured to execute the program code.

The invention can be implemented in hardware and/or software.

BRIEF DESCRIPTION OF DRAWINGS

Further embodiments of the invention will be described with respect to the following figures, in which:

FIG. 3 shows a diagram of a first image and a second image according to an implementation form;

In the figures, identical reference signs refer to identical or equivalent features.

DETAILED DESCRIPTION OF EMBODIMENTS OF THE INVENTION

Figure 1:
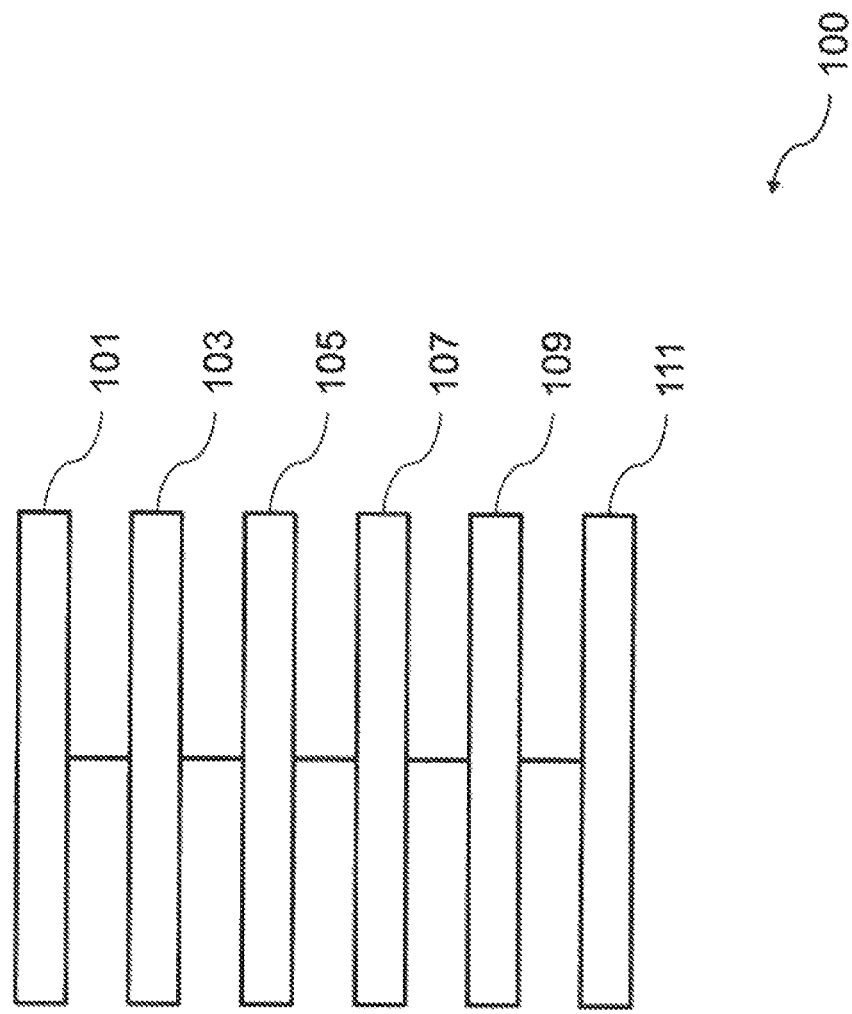
FIG. 1 shows a diagram of a method for detecting incorrect associations between keypoints of a first image and keypoints of a second image according to an implementation form.

FIG. 1 shows a diagram of a method 100 for detecting incorrect associations between keypoints of a first image and keypoints of a second image according to an implementation form. The keypoints of the first image indicating characteristic features of the first image are associated with keypoints of the second image indicating characteristic features of the second image whereby initial associations between keypoints of the first image and keypoints of the second image are formed. The initial associations are indicated by an indicator. The initial associations comprise the incorrect associations.

The method 100 comprises associating 101 every keypoint of the first image with every keypoint of the second image to obtain global associations, determining 103 similarity measures for pairs of initial associations, determining 105 similarity measures for pairs of global associations, determining 107 a first number of pairs of initial associations having a similarity measure within a predetermined range, determining 109 a second number of pairs of global associations having a similarity measure within the predetermined range, and comparing 111 the first number of pairs with the second number of pairs to detect the incorrect associations.

The first image and the second image can be texture images. The first image and the second image can further comprise depth maps. The characteristic features of the first image or the second image can be geometric features, such as corners.

The initial associations between keypoints of the first image and keypoints of the second image can be obtained by keypoint matching techniques. The indicator can be a vector or a matrix. A similarity measure for a pair of initial associations or for a pair of global associations can be a real number, e.g. 1.8 or 2.5.

The predetermined range can be a range of real numbers, e.g. 1.0 to 1.2. The predetermined range can be a bin of a histogram of the similarity measures for pairs of initial associations or a bin of a histogram of the similarity measures for pairs of global associations.

The distribution of the similarity measures for pairs of initial associations and the distribution of the similarity measures for pairs of global associations can indicate a respective probability density function. Therefore, the statistics of the similarity measures can be considered. The incorrect associations can consequently be detected by statistical comparison.

Figure 2:
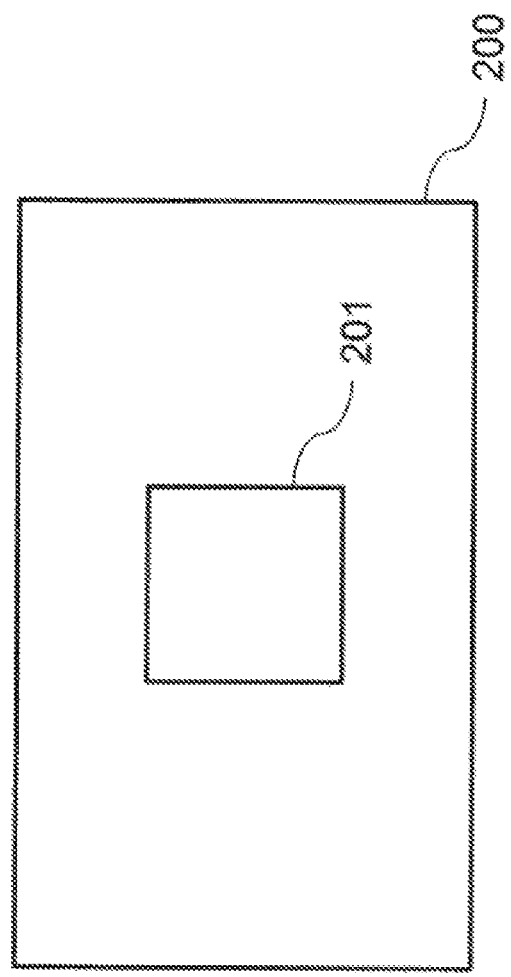
FIG. 2 shows a diagram of an apparatus for detecting incorrect associations between keypoints of a first image and keypoints of a second image according to an implementation form.

FIG. 2 shows a diagram of an apparatus 200 for detecting incorrect associations between keypoints of a first image and keypoints of a second image according to an implementation form.

The keypoints of the first image indicating characteristic features of the first image are associated with keypoints of the second image indicating characteristic features of the second image whereby initial associations between keypoints of the first image and keypoints of the second image are formed. The initial associations are indicated by an indicator. The initial associations comprise the incorrect associations.

The apparatus 200 comprises a processor 201 being configured to associate every keypoint of the first image with every keypoint of the second image to obtain global associations, to determine similarity measures for pairs of initial associations, to determine similarity measures for pairs of global associations, to determine a first number of pairs of initial associations having a similarity measure within a predetermined range, to determine a second number of pairs of global associations having a similarity measure within the predetermined range, and to compare the first number of pairs with the second number of pairs to detect the incorrect associations.

The processor 201 can be configured to execute a computer program.

Embodiments of the apparatus 200 can be adapted to perform the method 100 of FIG. 1. Further features of the apparatus 200 can directly result from the functionality of the method 100 of FIG. 1.

FIG. 3 shows a diagram of a first image 301 and a second image 303 according to an implementation form. The first image 301 comprises a first keypoint 305 and a third keypoint 309. The second image 303 comprises a second keypoint 307 and a fourth keypoint 311.

The first keypoint 305 and the third keypoint 309 of the first image 301 can indicate characteristic features of the first image 301. The second keypoint 307 and the fourth keypoint 311 of the second image 303 can indicate characteristic features of the second image 303. The characteristic features of the first image 301 or the second image 303 can be geometric features, such as corners.

Figure 4:
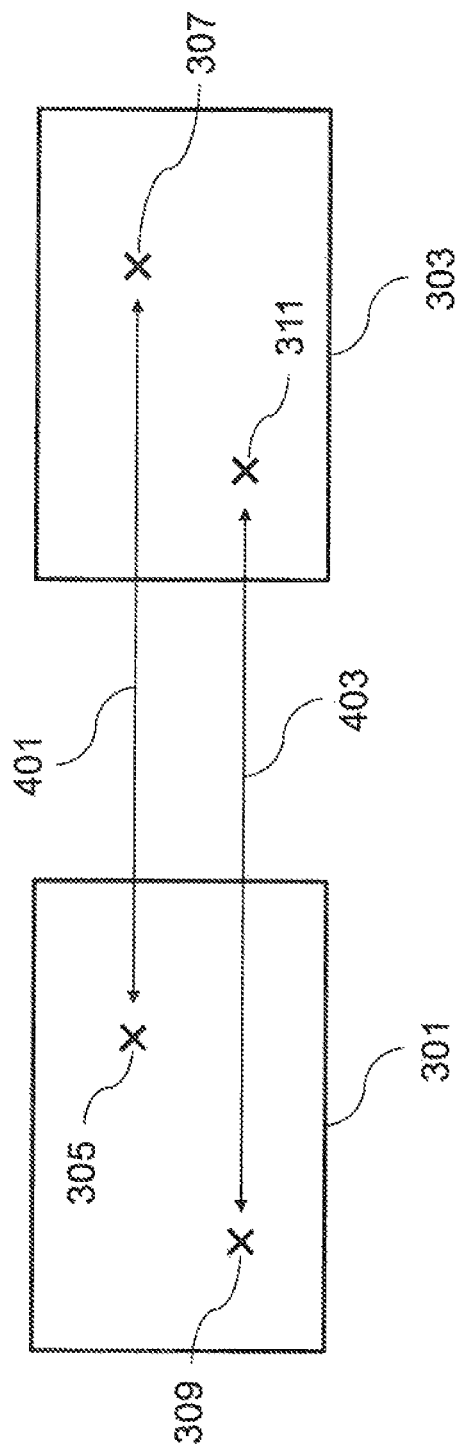
FIG. 4 shows a diagram of initial associations between keypoints of a first image and keypoints of a second image according to an implementation form.

FIG. 4 shows a diagram of initial associations 401, 403 between keypoints 305, 309 of a first image 301 and keypoints 307, 311 of a second image 303 according to an implementation form. The initial associations 401, 403 can be indicated by an indicator.

The keypoints 305, 309 in the first image 301 can be detected by detecting characteristic features, in particular corners, in the first image 301. The keypoints 307, 311 in the second image 303 can be detected by detecting characteristic features, in particular corners, in the second image 303.

First descriptors of the detected keypoints 305, 309 in the first image 301 can be determined, wherein the first descriptors can indicate features of the detected keypoints 305, 309 in the first image 301. Second descriptors of the detected keypoints 307, 311 in the second image 303 can be determined, wherein the second descriptors can indicate features of the detected keypoints 307, 311 in the second image 303. By associating the detected keypoints 305, 309 of the first image 301 with the detected keypoints 307, 311 of the second image 303 upon the basis of the first descriptors and the second descriptors, the initial associations 401, 403 can be obtained.

Figure 5:
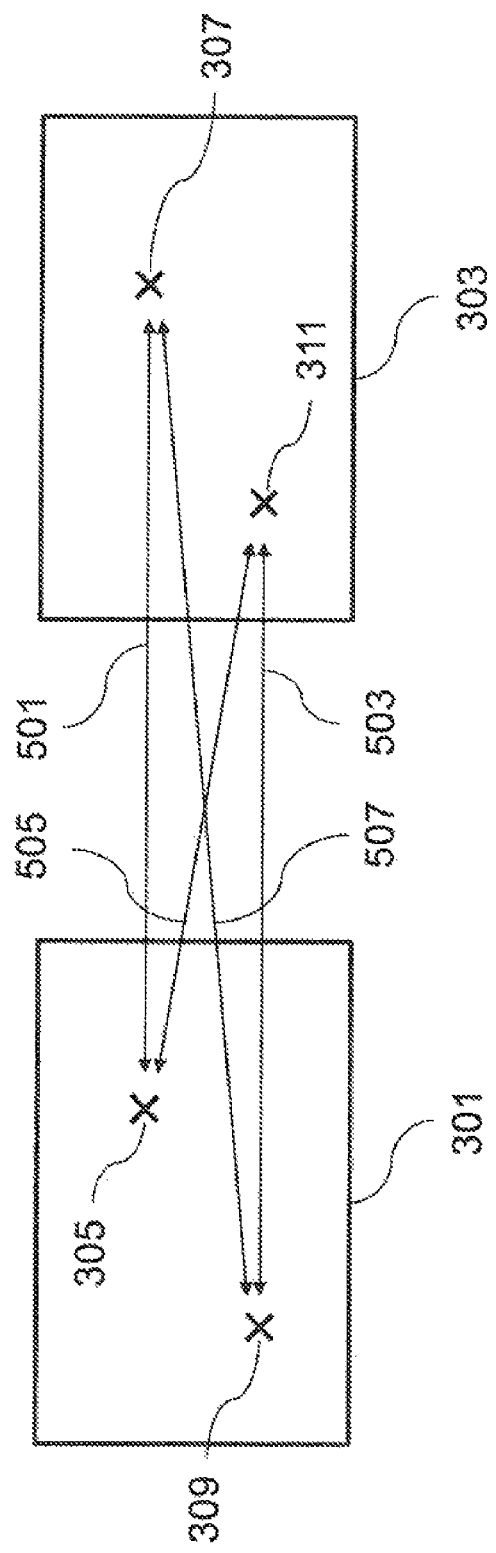
FIG. 5 shows a diagram of global associations between keypoints of a first image and keypoints of a second image according to an implementation form.

FIG. 5 shows a diagram of global associations 501, 503, 505, 507 between keypoints 305, 309 of a first image 301 and keypoints 307, 311 of a second image 303 according to an implementation form.

The keypoints 305, 309 in the first image 301 can be detected by detecting characteristic features, in particular corners, in the first image 301. The keypoints 307, 311 in the second image 303 can be detected by detecting characteristic features, in particular corners, in the second image 303.

By associating every keypoint 305, 309 of the first image 301 with every keypoint 307, 311 of the second image 303, the global associations 501, 503, 505, 507 can be obtained.

Figure 6:
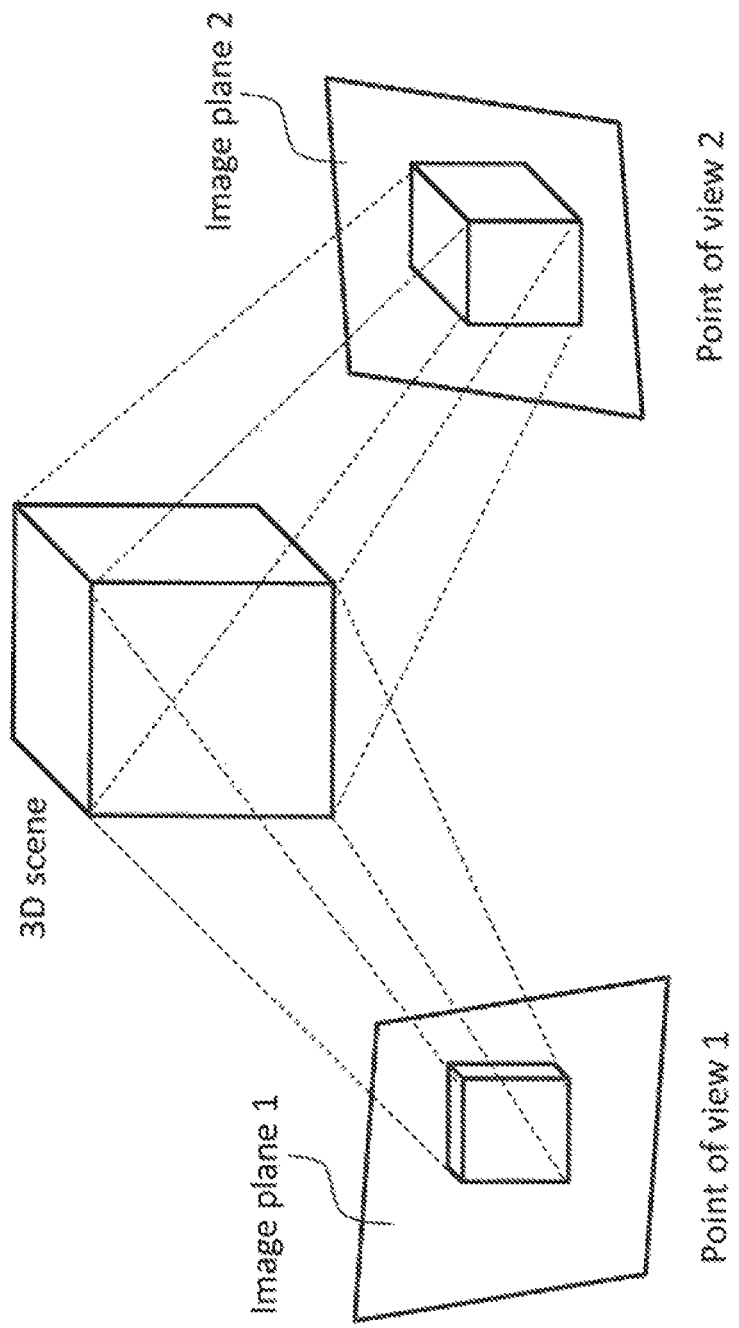
FIG. 6 shows a diagram of a perspective distortion of a 3D scene projected to two distinct image planes according to an implementation form.

FIG. 6 shows a diagram of a perspective distortion of a 3D scene projected to two distinct image planes according to an implementation form.

The invention can relate to the field of computer vision, in particular to the topics referred to as 2D/3D video image matching and/or comparison, and 3D reconstruction.

In the computer vision and image/video processing field, the capability of reliably assessing the similarity between texture images is a basic but yet rather complex task that can act as a building block for a wide range of application domains. These can include visual search, object detection, object recognition, camera tracking, object tracking, scene reconstruction, and more.

The image similarity assessment can be easily solved by a human, but can be a difficult problem from a machine point of view, since it can be based on an automatic interpretation of the digital image content starting from various low-level attributes.

In order to quantitatively measure the similarity between images a strategy can be to perform image matching. A method for image matching can rely on so called local features. Common methods can be Scale-Invariant Feature Transforms (SIFT), Speeded Up Robust Features (SURF), Oriented Binary Robust Independent Elementary Features (ORB), and Binary Robust Invariance Scalable Keypoints (BRISK), but many alternatives can be used.

A local feature can be a compact description, e.g. 128 Bytes for each feature in SIFT, of a patch surrounding a point in an image. In an image, the points upon which local features are computed can identify distinct elements of the scene, e.g. corners, and/or specific patterns, whose detection can be stable to illumination, scale, rotation, and perspective changes. Such points can be called keypoints. The similarity between image pairs can be assessed through the number and the positions of keypoints shared by the images, i.e. matching keypoints.

When a 3D image matching is computed, standard 2D texture image comparison can be applied. However, specific methods can try to take into consideration the additional information from a depth and/or disparity map.

A pipeline for image matching can comprise the following steps. Firstly, detection from the texture images of a set of interest points also referred to as keypoints, and extraction of the corresponding descriptors can be performed. Secondly, correspondence between feature points can be found, i.e. matching, by comparing the associated descriptors. The matching strategy can depend on the descriptor type and can include several more or less articulated strategies, e.g. brute-force, or kd-tree. Thirdly, due to the noise effects in the keypoint detection and/or mismatching of keypoints in the descriptor matching phase, the matching result can comprise correct associations, i.e. inliers, and incorrect or wrong associations, i.e. outliers, thus an incorrect association or outlier removal step can be performed. The incorrect association or outlier removal can rely on the assumption that correct matchings can present consistent positions in the two images, obeying to a geometric transformation between the two images, e.g. projective. In order to minimize the number of incorrect or wrong associations, procedures can be applied to find the model parameters that maximize the number of inliers. Fourthly, after the incorrect association or outlier elimination step, an assessment about the similarity between the images can be given as a function of the maximum correct association or inlier set found through all the iterations.

An important step in the image matching pipeline lies in the third step, where the filtering of incorrect or wrong associations can be carried out. Two main directions to solve the problem can be applied, iterative methods and non-iterative methods.

In the first group, several alternatives can be employed based on the Random Sample Consensus (RANSAC) method. The base approach of the RANSAC outlier detection can provide an iterative method for finding the best set of parameters of a model fitting a number of noisy observations. In general, a model can be employed for methods in this group, e.g. homography, affine transformation, and/or 3D roto-translation.

Among the non-iterative methods, an approach that can identify incorrect or outlier associations by analyzing a Log-Distance-Ratio (LDR) of a pair of associations or matches can be employed. The basic assumption behind this method can be that, due to the consistency of correctly matched keypoints' positions, the ratio of the distances between keypoints can remain constant across the images. Since the statistical properties of the LDR for pairs of incorrect associations or matches can be significantly different from the properties of the LDR for correct associations or matches, a LDR model for incorrect associations or matches, i.e. outliers, can be built and a goodness-of-fit test to detect the correct associations or inliers can be performed. This approach can be faster than the iterative methods, and can provide a more flexible solution because it is not based on any model, e.g. homography and/or affine, for the incorrect association or outlier detection.

An incorrect association or outlier detection strategy based on an iterative consistency check with a model of projective geometry, i.e. RANSAC and related modifications, can give good results in terms of accuracy. However, the time required to reach the convergence can be high. In particular, the time complexity can depend on a number of variables, including the selected model, i.e. the number of unknown parameters to estimate, the maximum number of allowed iterations, the termination criteria, the percentage of incorrect associations or outliers in the input data, and more. Therefore, a challenge of the methods belonging to this family can be the time required to reach the convergence, i.e. the number of effective iterations used to achieve an accurate solution.

A statistical model-free strategy can solve the convergence time problem. In fact the procedure can be natively non-iterative and the time complexity can depend only on the number of input association or matching pairs. However, although it can bring several advantages, the speed in particular, the capability of detecting correct associations or inlier matches in perspectively distorted images can be limited. In fact, the procedure can implicitly assume that the associated or matching keypoints lie on a plane.

When the keypoints do not belong to a planar surface, e.g. when associating or matching two different views of the same 3D scene, the perspective distortion can be high and the method may not be able to select the optimal number of correct associations or matches. In FIG. 6, a schematic diagram is presented depicting this challenge. When a 3D scene is projected to different image planes, according to the scene structure and spatial distance of the points of view, the distortion perceived in the image plane can be high.

Figure 7:
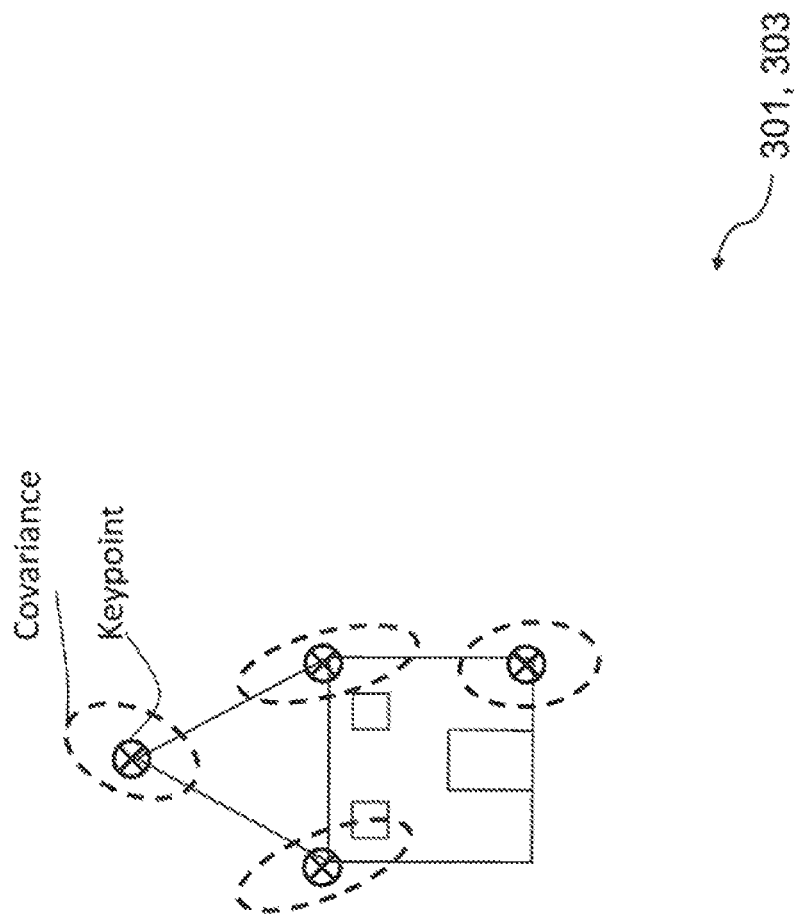
FIG. 7 shows a diagram of keypoints and covariance ellipses within a first image or a second image according to an implementation form.

FIG. 7 shows a diagram of keypoints and covariance ellipses within a first image 301 or a second image 303 according to an implementation form. The diagram can relate to a 2D image. The keypoints are depicted by crossed circles. The covariance ellipses are depicted by dashed ellipses.

Another challenge of both the iterative and non-iterative approaches can be related to the noise in the keypoint location computation. In fact, they may not take into account the noise effect in the keypoint extraction phase that actually has influence on the localization accuracy. This can be particularly true when scale-space keypoint extractors are considered, e.g. SIFT or SURF, where features at different scales can be extracted. In FIG. 7, a schematic diagram of the feature location uncertainty is depicted. The crossed circles are the detected or extracted keypoints, while the surrounding ellipses define an uncertainty area.

The invention relates to a method for filtering the incorrect or wrong keypoint associations, i.e. outlier matches, when performing the matching between image pairs. The method can be non-iterative and can rely on the concept of LDR to select the number of correct associations or inliers.

The invention can aim at overcoming the challenges of specific approaches concerning the keypoint location uncertainty in the LDR modelling. To reach this goal the uncertainty in the keypoint location can be modelled by a covariance matrix, and the keypoint-to-keypoint distance for the LDR modelling can be evaluated at a statistical level relying on the Mahalanobis distance. Moreover, when 3D images are available, i.e. texture images and corresponding depth maps, every detected keypoint can be projected in the 3D space, allowing extending the computation of the LDR in 3D space, and thus allowing also a correct modelling of perspectively distorted matches.

Figure 8:
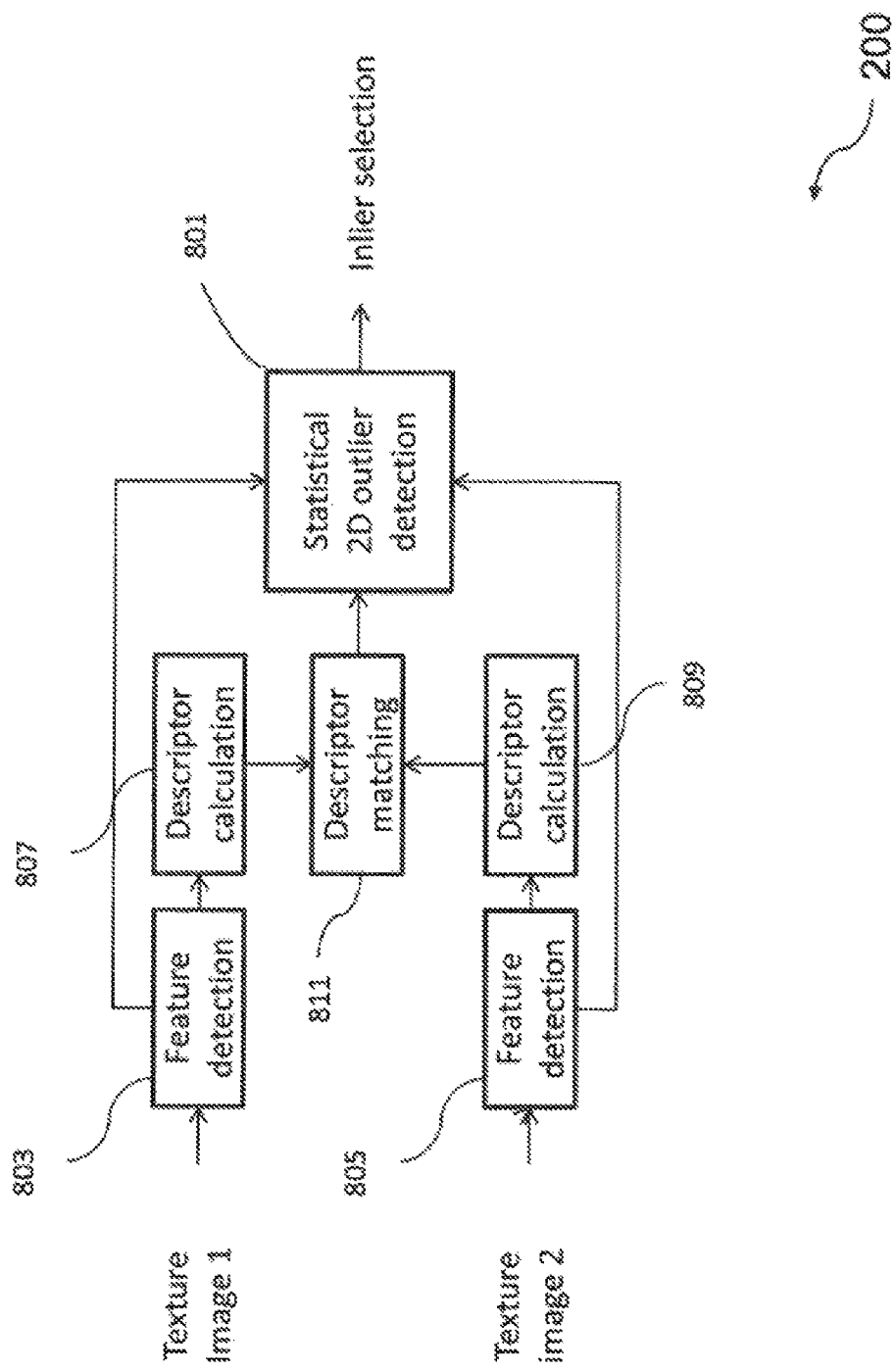
FIG. 8 shows a diagram of an apparatus for detecting incorrect associations between keypoints of a first image and keypoints of a second image according to an implementation form.

FIG. 8 shows a diagram of an apparatus 200 for detecting incorrect associations between keypoints of a first image and keypoints of a second image according to an implementation form. The diagram can relate to a 2D image correct association or inlier selection implementation.

The apparatus 200 comprises a statistical 2D outlier detection unit 801, a first feature detection unit 803, a second feature detection unit 805, a first descriptor calculation unit 807, a second descriptor calculation unit 809, and a descriptor matching unit 811.

The invention can relate to an apparatus 200 or method to robustly detect incorrect associations or outlier matches with a correct modeling of keypoint location uncertainty, and allowing accurate incorrect association or outlier detection in presence of 3D image pairs also with heavy perspective distortions. In FIG. 8, an implementation of the 2D image correct association or inlier selection is shown, wherein two texture images can be the inputs. A feature extraction and a description calculation phase can be carried out, followed by a descriptor matching step that can provide an initial set of keypoint associations. In block 801 the associations can be processed in order to remove the incorrect or wrong keypoint associations, i.e. incorrect association or outlier removal.

Figure 9:
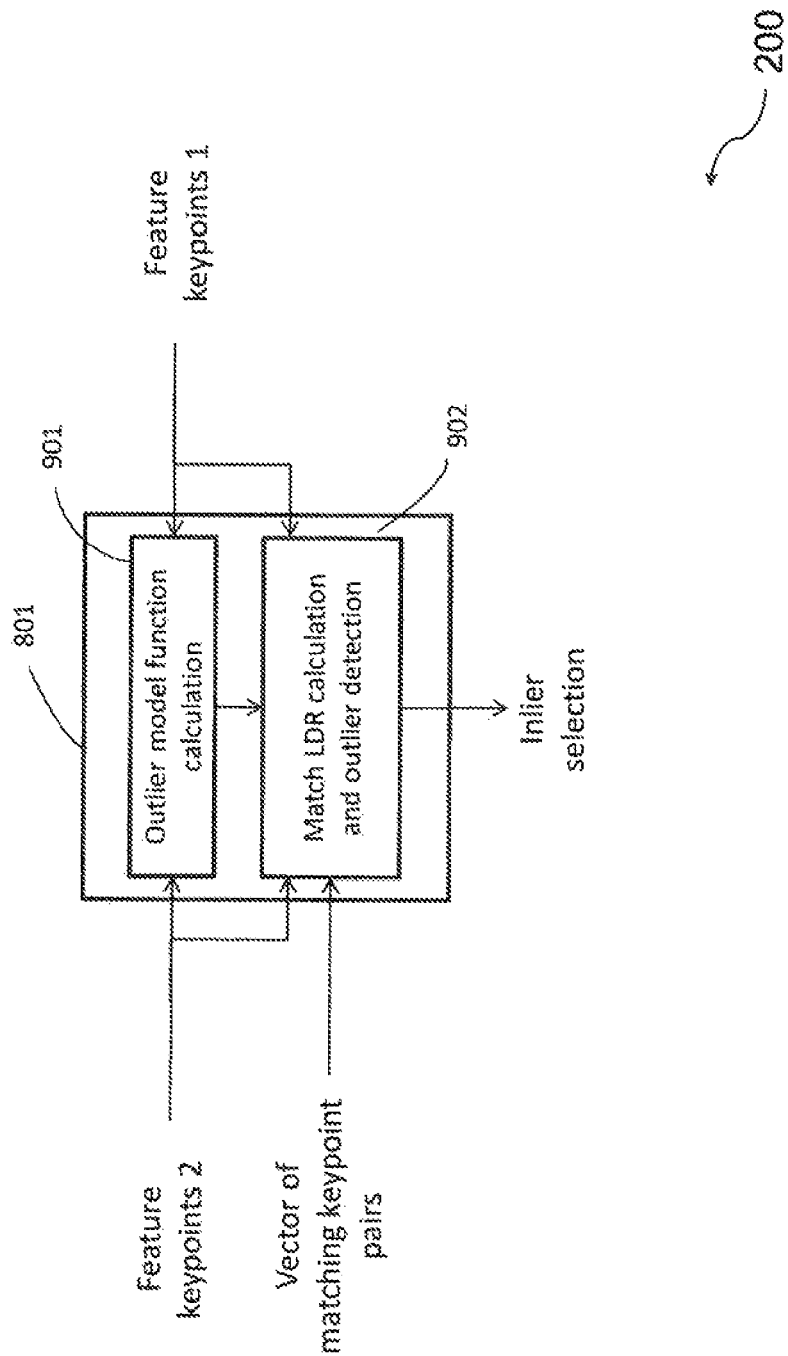
FIG. 9 shows a diagram of an apparatus for detecting incorrect associations between keypoints of a first image and keypoints of a second image according to an implementation form.

FIG. 9 shows a diagram of an apparatus 200 for detecting incorrect associations between keypoints of a first image and keypoints of a second image according to an implementation form. The diagram can relate to a statistical 2D in correct association or outlier match detection implementation according to an implementation form.

The apparatus 200 comprises a statistical 2D outlier detection unit 801. The statistical 2D outlier detection unit 801 comprises an outlier model function calculation unit 901 and a match LDR calculation and outlier detection unit 902.

In the invention, two stages can be provided, i.e. block 801 in FIG. 9. The inputs can be the keypoints extracted from the two texture images, and the set or vector of keypoint pairs, i.e. associated matches, e.g. provided by matching methods. In an initial phase, a Log Distance Ratio, i.e. LDR, model function for incorrect associations or outlier matches can be evaluated in block 901. Successively, the LDR model function for the matching keypoints can be evaluated and the incorrect associations or outliers can be detected according to a goodness-of-fit test.

Figure 10:
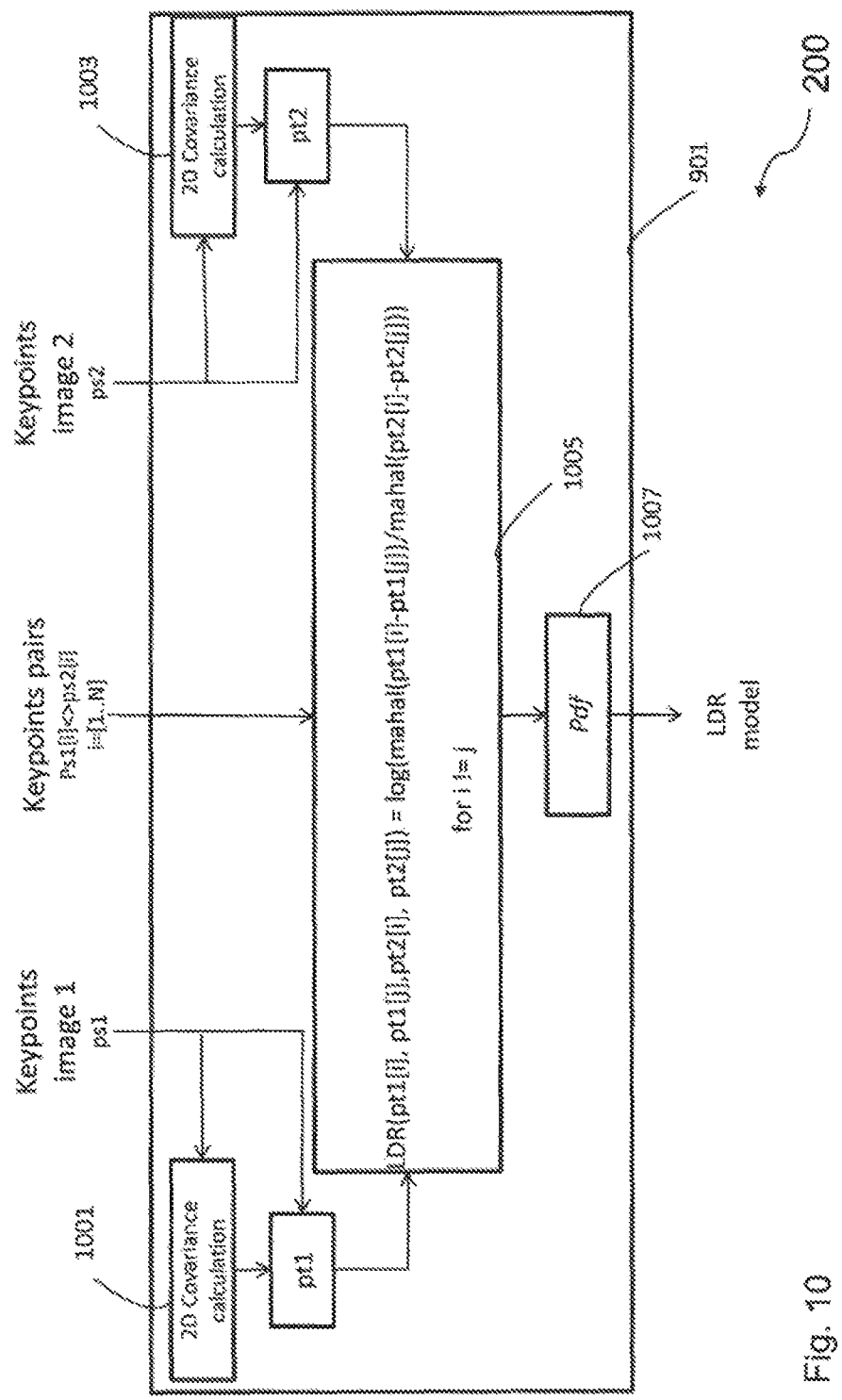
FIG. 10 shows a diagram of an apparatus for detecting incorrect associations between keypoints of a first image and keypoints of a second image according to an implementation form.

FIG. 10 shows a diagram of an apparatus 200 for detecting incorrect associations between keypoints of a first image and keypoints of a second image according to an implementation form. The diagram can relate to a 2D model function calculation according to an implementation form.

The apparatus 200 comprises an outlier model function calculation unit 901. The outlier model function calculation unit 901 comprises a first 2D covariance calculation unit 1001, a second 2D covariance calculation unit 1003, an LDR determination unit 1005, and a probability density function determining unit 1007.

The model function calculation can be performed according to block 901 in FIG. 10. The inputs can be two sets of keypoints extracted from the two images and a number of correspondences between them. When calculating the LDR model function for the incorrect associations or outliers in block 901, the correspondences can be basically all the possible combinations of the keypoints in the two sets. Instead, when the correct association or inlier model function is evaluated in block 902, the correspondences can be the associations or matches provided by point matching techniques.

Figure 11:
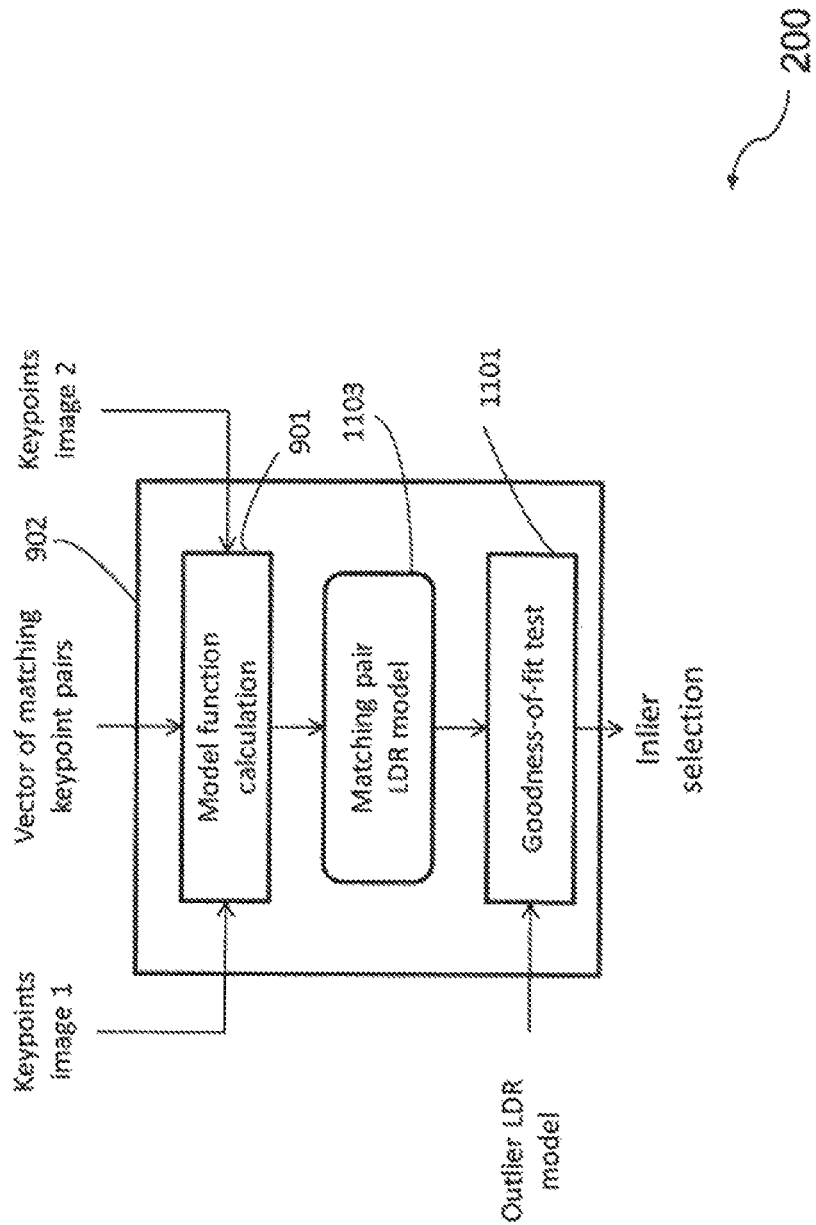
FIG. 11 shows a diagram of an apparatus for detecting incorrect associations between keypoints of a first image and keypoints of a second image according to an implementation form.

In other words, the algorithm for the LDR model can be the same for the incorrect association or outlier model function calculation 901 in FIG. 9 and for the correct association or inlier model function calculation 901 as part of block 902 as shown in FIG. 11. In both cases, the details as shown in FIG. 10 can apply, but the input data can change according to the model to generate, i.e. incorrect or correct associations, i.e. outliers or inliers.

In blocks 1001, 1003, the keypoints covariance calculation can be performed, allowing the definition of an uncertainty area around each keypoint in form of an ellipse in the image plane. A good approximation for the keypoint covariance can be the inverse of the second order derivative constructed from the texture image intensity values, i.e. a hessian matrix. For scale space features, the hessian matrix can be provided by the keypoint detector.

In block 1005, the LDR between a pair of associations or matches can be calculated relying on the Mahalanobis distance. In particular, the Mahalanobis distance between two random vectors x and y, i.e. two keypoints, with covariance C can be defined as $M(x,y)=sqrt((x-y)C(x-y))$, wherein sqrt stands for squared-root. In this context, x and y can be two keypoints in 2D space, with associated covariance matrices, Cx and Cy. In block 1005, when the distance is evaluated between two keypoints, the corresponding covariance matrices can be summed, so C=Cx+Cy. The statistics of the LDR for all the provided pairs can be summarized in form of a probability density function, i.e. pdf, which can represent the LDR model.

FIG. 11 shows a diagram of an apparatus 200 for detecting incorrect associations between keypoints of a first image and keypoints of a second image according to an implementation form. The diagram can relate to a matching 2D model LDR calculation and outlier detection.

The apparatus 200 comprises a match LDR calculation and outlier detection unit 902. The match LDR calculation and outlier detection unit 902 comprises an outlier model function calculation unit 901, a matching pair LDR model unit 1103, and a goodness-of-fit test unit 1101.

In block 902 in FIG. 11, the LDR model for the associated or matching keypoints can be evaluated. The algorithm for the LDR model calculation can be described using block 901. In particular, the inputs can be the keypoints from the two images and the keypoint associations provided by matching techniques. Successively, the incorrect associations or outlier matches can be discarded by comparing the LDR model of incorrect associations or outliers and correct associations or inliers through a goodness-of-fit test in block 1101.

Figure 12:
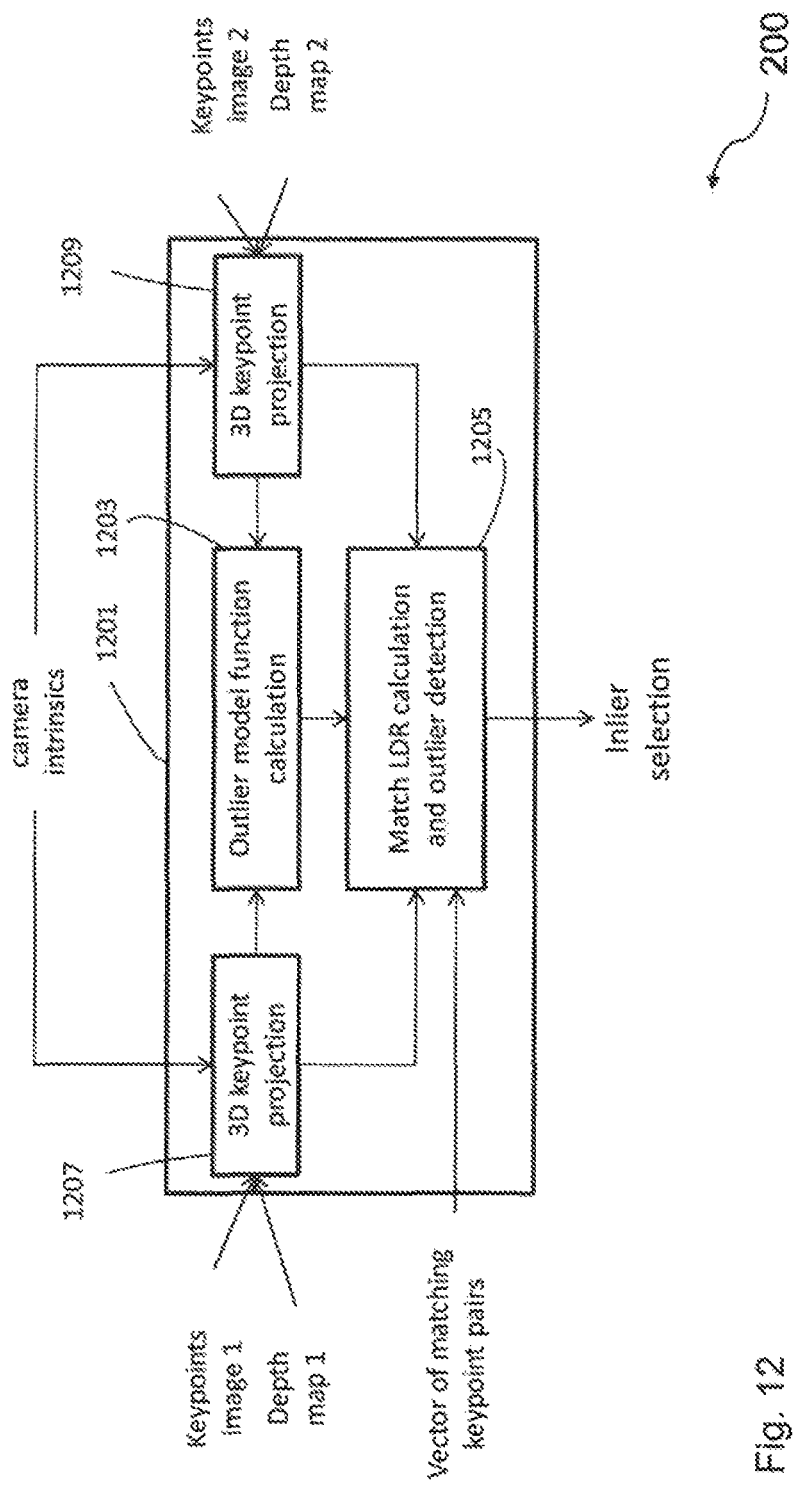
FIG. 12 shows a diagram of an apparatus for detecting incorrect associations between keypoints of a first image and keypoints of a second image according to an implementation form.

FIG. 12 shows a diagram of an apparatus 200 for detecting incorrect associations between keypoints of a first image and keypoints of a second image according to an implementation form. The diagram can relate to statistical 3D outlier match detection.

The apparatus 200 comprises a statistical 3D outlier detection unit 1201, an outlier model function calculation unit 1203, a match LDR calculation and outlier detection unit 1205, a first 3D keypoint projection unit 1207, and a second 3D keypoint projection unit 1209.

The statistical incorrect association or outlier match detection in presence of depth information is depicted. Basically, this block can be an extension to 3D of block 801 which has been previously described. In this context, the inputs can be a pair of 3D images, i.e. texture image and a depth map, the set of matching keypoints, and additionally the image capturing parameters or camera intrinsic parameters. In blocks 1207, 1209, the keypoints detected in the texture images can be back-projected in the 3D space relying on the image capturing parameters or camera intrinsic parameters and the depth information from the depth map. Block 1203 can provide for the LDR model function calculation for incorrect associations or outliers, while block 1205 can carry out the modeling of LDR for the matching keypoints.

Figure 13:
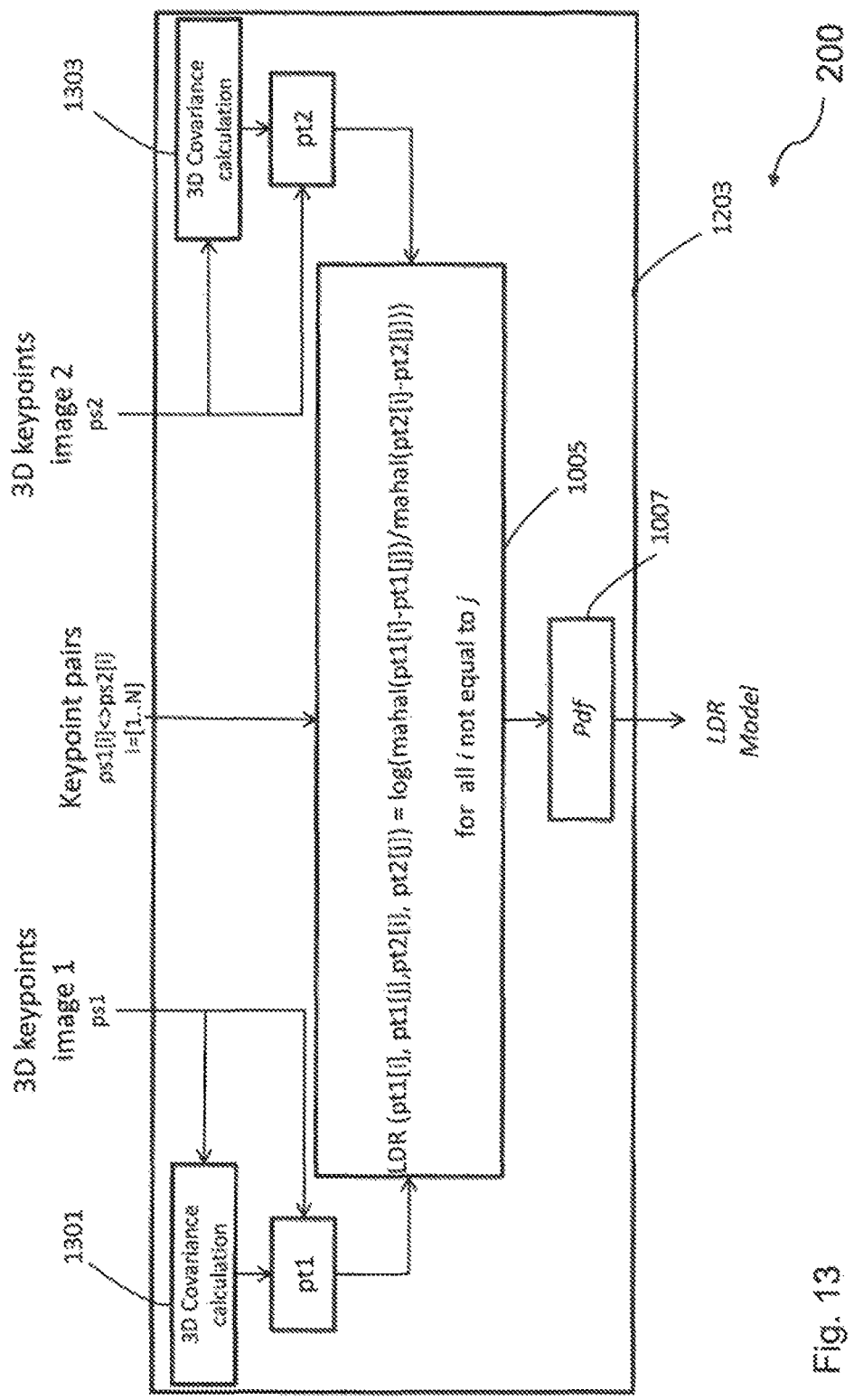
FIG. 13 shows a diagram of an apparatus for detecting incorrect associations between keypoints of a first image and keypoints of a second image according to an implementation form.

FIG. 13 shows a diagram of an apparatus 200 for detecting incorrect associations between keypoints of a first image and keypoints of a second image according to an implementation form. The diagram can relate to a 3D model function calculation.

The apparatus 200 comprises an outlier model function calculation unit 1203. The outlier model function calculation unit 1203 comprises an LDR determination unit 1005, a first 3D covariance calculation unit 1301, a second 3D covariance calculation unit 1303, and a probability density function determining unit 1007.

Block 1203 in FIG. 13 can provide for a 3D LDR model function calculation, i.e. an extension of block 901. The inputs can be two sets of 3D keypoints belonging to the two images and a number of correspondences between them. When calculating the LDR model function for the incorrect associations or outliers, these correspondences can be basically all the possible combinations of the keypoints in the two sets. When the correct association or inlier model function is evaluated, the correspondences can be the associations or matches provided by point matching techniques.

In blocks 1301, 1303, the keypoint covariance calculation can be performed, allowing the definition of an uncertainty volume around each 3D keypoint in the form an ellipsoid. In the 3D scenario, the covariance for each keypoint can be associated to the keypoint depth uncertainty, which can be in turn dependent on the specific depth sensor. When using suitable cameras or sensors, one possibility to estimate the covariance matrix can be the following.

Given a texture camera horizontal and vertical field of views, i.e. Hfov and Vfov, respectively, and the camera or sensor resolution, i.e. Hres and Vres, respectively, the raster variance in horizontal and vertical dimension can be calculated as $Hvar=(tan(Hfov/Hres))2$, and $Vvar=(tan(Vfov/Vres))2$.

For each 3D point p=(px, py, pz), the covariance matrix can be a diagonal 3×3 matrix where the elements of each row can express the covariance in X, Y, and Z dimension. Specifically, $Cov\_x=pz*Hvar$, $Cov\_y=pz*Vvar$, $Cov\_z=(alpha*pz2)2$. The alpha value can depend on the camera or sensor accuracy. In particular, the quantity alpha*pz2 can be the standard deviation of the depth estimation which can depend on the camera or sensor accuracy.

In block 1005, the LDR between pair of associations or matches can be calculated relying on the Mahalanobis distance. The statistics of the LDR for all the corresponding pairs can be summarized in form of a probability density function, i.e. pdf, which can represent the LDR model.

Figure 14:
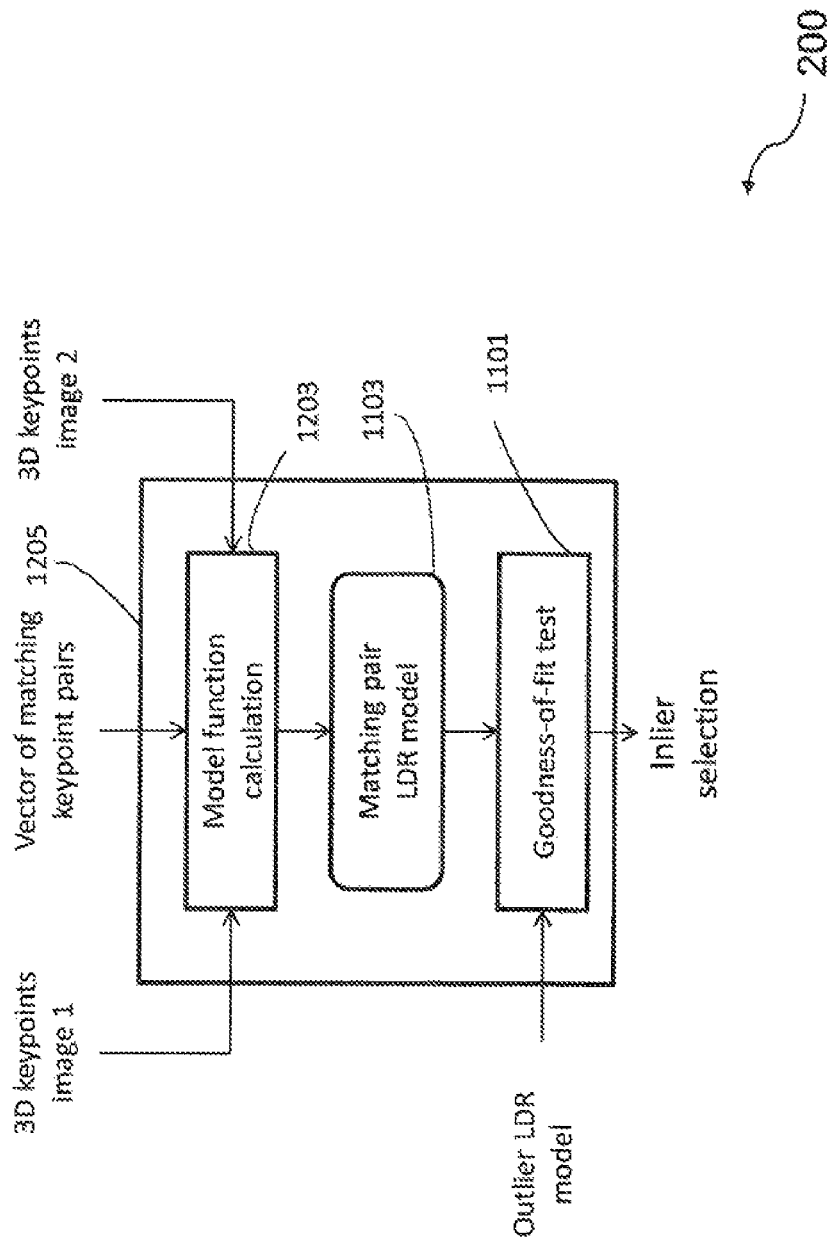
FIG. 14 shows a diagram of an apparatus for detecting incorrect associations between keypoints of a first image and keypoints of a second image according to an implementation form.

FIG. 14 shows a diagram of an apparatus 200 for detecting incorrect associations between keypoints of a first image and keypoints of a second image according to an implementation form. The diagram can relate to a matching 3D LDR model function calculation and outlier detection.

The apparatus 200 comprises a match LDR calculation and outlier detection unit 1205. The match LDR calculation and outlier detection unit 1205 comprises an outlier model function calculation unit 1203, a matching pair LDR model unit 1103, and a goodness-of-fit test unit 1101.

In block 1205 in FIG. 14, the LDR model for the associated or matching keypoints can be evaluated. The algorithm for the LDR model calculation can be shown in block 901. In particular, the inputs can be the keypoints from the two images and the keypoint associations provided by matching techniques. Successively, the incorrect associations or outlier matches can be discarded by comparing the LDR model of incorrect associations or outliers and correct associations or inliers through a goodness-of-fit test shown in block 1101. The procedure can follow a goodness-of-fit test and an extraction of specific correct associations or inlier matches.

Figure 15:
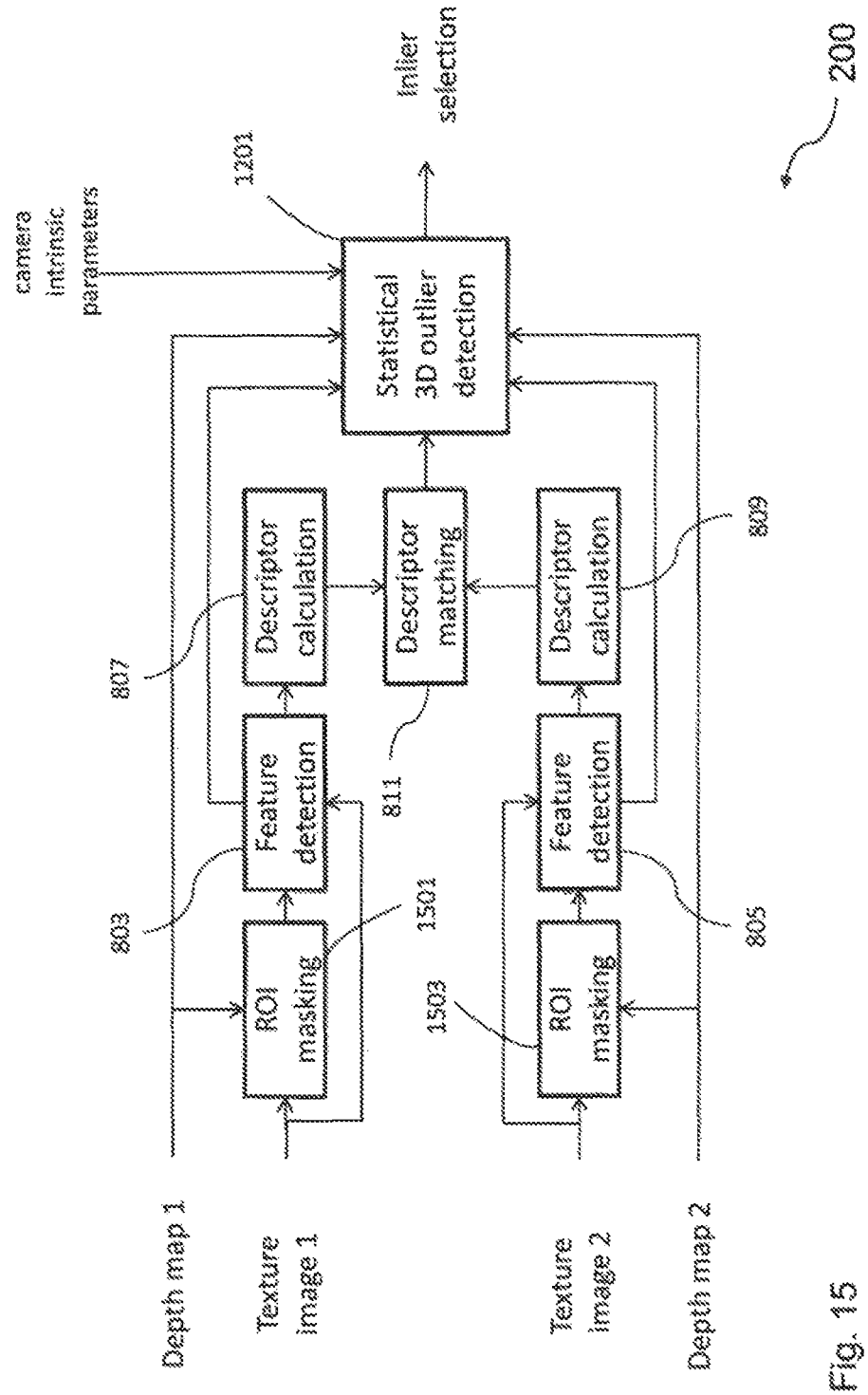
FIG. 15 shows a diagram of an apparatus for detecting incorrect associations between keypoints of a first image and keypoints of a second image according to an implementation form.

FIG. 15 shows a diagram of an apparatus 200 for detecting incorrect associations between keypoints of a first image and keypoints of a second image according to an implementation form. The diagram can relate to a 3D image inlier selection implementation.

The apparatus 200 comprises a statistical 3D outlier detection unit 1201, a first feature detection unit 803, a second feature detection unit 805, a first descriptor calculation unit 807, a second descriptor calculation unit 809, a descriptor matching unit 811, a first region of interest masking unit 1501, and a second region of interest masking unit 1503.

An implementation of a 3D image correct association or inlier selection is shown, wherein a pair of 3D images can be the input, together with the image capturing parameters or camera intrinsic parameters.

In an initial stage, a region of interest can be extracted according to the confidence level of the depth measurement. Successively, a feature extraction and description calculation phase can be carried out, followed by a descriptor matching step that can provide the initial set of keypoint associations. In block 1201 the associations can be processed in order to remove the incorrect or wrong associations or matches.

Figure 16:
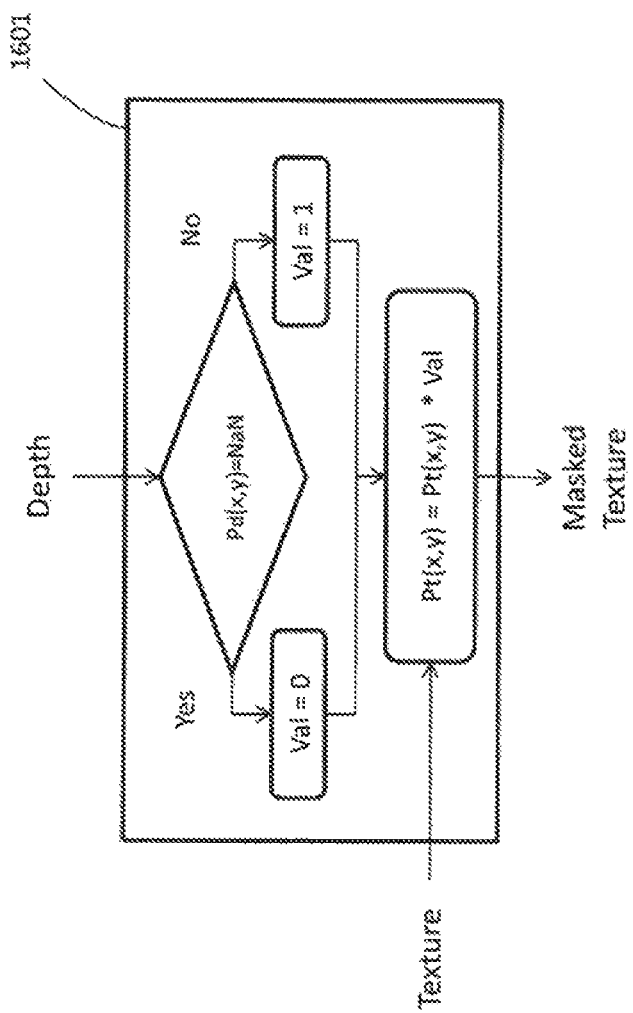
FIG. 16 shows a diagram of a region of interest masking unit according to an implementation form.

FIG. 16 shows a diagram of a region of interest masking unit 1601 according to an implementation form.

Block 1601 in FIG. 16 can provide for filtering non-valid depth values. The corresponding location in the texture image can be masked so that the feature extraction may not be carried out in these areas. This filtering of non-valid depth values can enhance further the robustness of the incorrect association or outlier detection and image comparison. In an implementation form, the region of interest masking unit 1601 is employed as first region of interest masking unit 1501 and second region of interest masking unit 1503 of FIG. 15.

The texture image can be an image acquired from a specified viewpoint, containing information about color and texture of the visual scene. It can be represented in RGB or YUV format. It can also be referred to as picture or as frame in the context of video. The depth map can be a gray scale image in which the value of every point determines a distance to the camera of the visual scene represented by this point. Alternatively, a disparity map may be used, which values can be inversely proportional to the ones of the depth map. The region-of-interest can be denoted as ROI.

The 3D image can be a signal comprising a texture image and a corresponding depth map or disparity map. The texture image and depth or disparity map can be registered. This can mean that the pixels in the same location can contain information about the same scene point. The point cloud can be a data structure obtained by projecting a texture image into a 3D space according to a camera model, e.g. a pinhole camera, the image capturing parameters or camera intrinsic parameters, and/or the information from the associated depth or disparity map. The video sequence can be a set of subsequent texture images, which can also be referred to as frames.

The image capturing parameters or camera intrinsic parameters can comprise a matrix obtained through a calibration process. They can provide information about focal length, optical center, and pixel aspect ratio. They can also be referred to as intrinsics.

The keypoint can be a point in one image showing detection stability under local and global perturbations in the image domain, including perspective transformations, changes in image scale, and illumination variations. The local feature can be a compact description of a patch surrounding a keypoint in the image.

The invention can relate to a method and an apparatus for outlier detection for robust 2D-3D image comparison. The method can be applied by an encoder or a decoder.

An LDR histogram can be used to identity an object that is visible in an image, i.e. the query, by finding an image containing a view of the object in the query among the images in a collection of references. A method for identification can be employed that can make a binary decision between the hypotheses H0, i.e. the reference image does not contain a view of the object in the query and H1, i.e. the reference image does contain a view of the object in the query.

The H0 hypothesis can represent an expected state of things because almost all reference images contain no view of the object in the query. A certain amount of evidence can be relevant in order to reject H0 and accept H1, i.e. the exceptional event. This evidence can be found in the relation between the LDR histogram and the model function. If the histogram fits the model function well, then the H0 hypothesis can be accepted, if not, the H1 hypothesis can be accepted. A method for testing such hypotheses can be Pearson's chi-square test. Let the LDR histogram have K bins, h1, . . . , hK. The histogram can be compared to the discretized model function, integrated over each bin to yield the model probabilities p1, . . . , pK. These quantities can be used to formulate the test.

At an $\alpha$ level of significance, the H1 hypothesis can be accepted if $$c = \sum_{k=1}^{K} \frac{(h_k - np_k)^2}{np_k} \geq \chi^2_{1-\alpha, K-1}$$

wherein n can be the number of pairs of matches that are used to construct the histogram, i.e. the sum of the histogram values. The threshold $x^2_{1-\alpha, K-1}$ can be the 100 (1-$\alpha$) percentile of the chi square distribution with K-1 degrees of freedom.

The goodness-of-fit parameter c can have a high value if the shape of the LDR histogram differs much from that of the model function, implying that many of the associations or matches can be correct associations or inliers. The parameter c can be used as a measure of resemblance between the two images.

Embodiments of the apparatus 200 as described based on FIGS. 8 to 16 can be implemented by implementing the different units and modules described therein as hardware units or as software modules, or as any combination thereof.

Particular embodiments of the apparatus 200 as described based on FIGS. 8 to 16 can be implemented by implementing one, some or all of the different units and modules described therein as software modules of a computer program, which can be executed by a processor 201 as described based on FIG. 2.

What is claimed is:

1. A method for detecting incorrect associations between keypoints of a first image and keypoints of a second image, keypoints of the first image indicating characteristic features of the first image associated with keypoints of the second image indicating characteristic features of the second image, the method comprising:
    forming initial associations between keypoints of the first image and keypoints of the second image, wherein the initial associations comprise incorrect associations;
    associating every keypoint of the first image with every keypoint of the second image to obtain global associations;
    determining similarity measures for pairs of initial associations;
    determining similarity measures for pairs of global associations;
    determining a first number of pairs of initial associations having similarity measures within a predetermined range;
    determining a second number of pairs of global associations having similarity measures within the predetermined range; and
    comparing the first number of pairs with the second number of pairs to detect whether the initial associations corresponding to the first number of pairs comprise incorrect associations.

2. The method of claim 1, further comprising:
    normalizing the first number of pairs based on the number of all pairs of initial associations; and
    normalizing the second number of pairs based on the number of all pairs of global associations.

3. The method of claim 1, wherein a first association comprises a first keypoint in the first image and a second keypoint in the second image, wherein a second association comprises a third keypoint in the first image and a fourth keypoint in the second image, and wherein a similarity measure for the pair comprising the first association and the second association is determined according to the following equations:

$$ldr(x_i, x_j, y_i, y_j) = \ln\left(\frac{\|x_i - x_j\|}{\|y_i - y_j\|}\right)$$

$\|x_i - x_j\| = \text{sqrt}((x_i - x_j) C_{xixj}(x_i - x_j))$ with $C_{xixj} = C_{xi} + C_{xj}$ $\|y_i - y_j\| = \text{sqrt}((y_i - y_j) C_{yiyj}(y_i - y_j))$ with $C_{yiyj} = C_{yi} + C_{yj}$ wherein $x_i$ denotes a location of the first keypoint in the first image, $x_j$ denotes a location of the third keypoint in the first image, $y_i$ denotes a location of the second keypoint in the second image, $y_j$ denotes a location of the fourth keypoint in the second image, $\|\cdot\|$ denotes a distance, sqrt denotes a square-root operation, $C_{xi}$ denotes a first covariance matrix, $C_{xj}$ denotes a third covariance matrix, $C_{yi}$ denotes a second covariance matrix, $C_{yj}$ denotes a fourth covariance matrix, $C_{xixj}$ denotes a first combined covariance matrix, $C_{yiyj}$ denotes a second combined covariance matrix, and ldr denotes the similarity measure.

4. The method of claim 3, wherein the first covariance matrix or the third covariance matrix is determined based on a second derivative of values of pixels of the first image, and wherein the second covariance matrix or the fourth covariance matrix is determined based on a second derivative of values of pixels of the second image.

5. The method of claim 3, wherein the first image comprises a first depth map and the second image comprises a second depth map, wherein the first depth map indicates depths of keypoints of the first image, wherein the second depth map indicates depths of keypoints of the second image, and wherein the first covariance matrix, the second covariance matrix, the third covariance matrix, or the fourth covariance matrix is determined based on the first depth map or the second depth map.

6. The method of claim 1, wherein the first image comprises a first depth map and the second image comprises a second depth map, wherein the first depth map indicates depths of keypoints of the first image, wherein the second depth map indicates depths of keypoints of the second image, and wherein the similarity measures for the pairs of initial associations and the pairs of global associations are determined based on the first depth map and the second depth map.

7. The method of claim 1, wherein the first image is characterized by a first image capturing parameter and the second image is characterized by a second image capturing parameter, and wherein the similarity measures for the pairs of initial associations and the pairs of global associations are determined based on the first image capturing parameter and the second image capturing parameter.

8. The method of claim 1, comprising:
    detecting keypoints in the first image by detecting corners in the first image; and
    detecting keypoints in the second image by detecting corners in the second image.

9. The method of claim 8, further comprising:
    determining first descriptors of the detected keypoints in the first image, the first descriptors indicating features of the detected keypoints in the first image;
    determining second descriptors of the detected keypoints in the second image, the second descriptors indicating features of the detected keypoints in the second image; and
    associating the detected keypoints of the first image with the detected keypoints of the second image based on the first descriptors and the second descriptors to obtain the initial associations.

10. The method of claim 1, wherein the first image comprises a first depth map and the second image comprises a second depth map, wherein the first depth map indicates a depth of pixels of the first image, wherein the second depth map indicates a depth of pixels of the second image, and wherein a value of a pixel of the first image or a value of a pixel of the second image is set to zero based on a value of a pixel of the first depth map or a value of a pixel of the second depth map.

11. The method of claim 1, wherein comparing the first number of pairs with the second number of pairs comprises:
- determining whether the first number of pairs is smaller than the second number of pairs, and
- detecting that the initial associations corresponding to the first number of pairs comprise incorrect associations if the first number of pairs is smaller than the second number of pairs.

12. A device for detecting incorrect associations between keypoints of a first image and keypoints of a second image, keypoints of the first image indicating characteristic features of the first image associated with keypoints of the second image indicating characteristic features of the second image, the device comprising:
- a non-transitory, computer-readable medium having processor-executable instructions stored thereon; and
- a processor, configured to execute the processor-executable instructions for:
  - forming initial associations between keypoints of the first image and keypoints of the second image, wherein the initial associations comprise incorrect associations;
  - associating every keypoint of the first image with every keypoint of the second image to obtain global associations;
  - determining similarity measures for pairs of initial associations;
  - determining similarity measures for pairs of global associations;
  - determining a first number of pairs of initial associations having similarity measures within a predetermined range;
  - determining a second number of pairs of global associations having similarity measures within the predetermined range; and
  - comparing the first number of pairs with the second number of pairs to detect whether the initial associations corresponding to the first number of pairs comprise incorrect associations.

13. The device of claim 12, wherein the processor is further configured to execute the processor-executable instructions for:
- detecting keypoints in the first image by detecting corners in the first image; and
- detecting keypoints in the second image by detecting corners in the second image.

14. The device of claim 13, wherein the processor is further configured to execute the processor-executable instructions for:
- determining first descriptors of the detected keypoints in the first image, the first descriptors indicating features of the detected keypoints in the first image;
- determining second descriptors of the detected keypoints in the second image, the second descriptors indicating features of the detected keypoints in the second image; and
- associating the detected keypoints of the first image with the detected keypoints of the second image based on the first descriptors and the second descriptors to obtain the initial associations.

15. A non-transitory, computer-readable medium having processor-executable instructions stored thereon for detecting incorrect associations between keypoints of a first image and keypoints of a second image, keypoints of the first image indicating characteristic features of the first image associated with keypoints of the second image indicating characteristic features of the second image, the processor-executable instructions, when executed, facilitating performance of the following:
- forming initial associations between keypoints of the first image and keypoints of the second image, wherein the initial associations comprise incorrect associations;
- associating every keypoint of the first image with every keypoint of the second image to obtain global associations;
- determining similarity measures for pairs of initial associations;
- determining similarity measures for pairs of global associations;
- determining a first number of pairs of initial associations having similarity measures within a predetermined range;
- determining a second number of pairs of global associations having similarity measures within the predetermined range; and
- comparing the first number of pairs with the second number of pairs to detect whether the initial associations corresponding to the first number of pairs comprise incorrect associations.

* * * * *